(12) United States Patent
Schloemer et al.

(10) Patent No.: US 11,228,362 B2
(45) Date of Patent: Jan. 18, 2022

(54) SYSTEM AND METHOD FOR SATELLITE CONSTELLATION MANAGEMENT AND SCHEDULING

(71) Applicant: Raytheon Company, Waltham, MA (US)

(72) Inventors: Jeffrey D. Schloemer, Centennial, CO (US); Thomas W. Thorpe, Parker, CO (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/852,214

(22) Filed: Apr. 17, 2020

(65) Prior Publication Data

US 2021/0328660 A1    Oct. 21, 2021

(51) Int. Cl.
*H04B 7/185*    (2006.01)

(52) U.S. Cl.
CPC ..... *H04B 7/18519* (2013.01); *H04B 7/18513* (2013.01); *H04B 7/18526* (2013.01); *H04B 7/18532* (2013.01)

(58) Field of Classification Search
CPC .. H04B 7/185; H04B 7/1851; H04B 7/18517; H04B 7/18519; H04B 7/18513; H04B 7/18526; H04B 7/18532
See application file for complete search history.

(56) References Cited

U.S. PATENT DOCUMENTS

| 9,262,734 B2 | 2/2016 | Augenstein et al. | |
| 10,277,309 B2* | 4/2019 | Kanner | H04B 7/18513 |
| 10,979,137 B2* | 4/2021 | Miranda | H04B 7/18584 |
| 2004/0158832 A1* | 8/2004 | Chechik | G01C 11/025 718/102 |
| 2013/0124079 A1* | 5/2013 | Olivier | B64G 3/00 701/301 |
| 2014/0040282 A1* | 2/2014 | Mann | B64G 1/1021 707/748 |

(Continued)

FOREIGN PATENT DOCUMENTS

| CN | 109948944 A | 6/2019 |
| WO | 2017/087372 A1 | 5/2017 |

OTHER PUBLICATIONS

Huang et al., "Coflow-Like Online Data Acquisition from Low-Earth-Orbit Datacenters", IEEE Transactions on Mobile Computing, vol. 19, No. 12, Dec. 2020 (accepted for publication as of Aug. 2019), pp. 2743-2760.

(Continued)

*Primary Examiner* — Blane J Jackson

(57) ABSTRACT

A method includes receiving request information obtained from an external user. The request information is associated with a task to be completed by at least one satellite asset among a plurality of satellite assets, where the satellite assets are grouped into a plurality of constellations and each of the constellations is associated with a corresponding scheduler among a plurality of schedulers. The method also includes assigning the task to a queue. The method further includes determining at least one specified scheduler to schedule the task at the at least one satellite asset. In addition, the method includes sending instructions to the at least one specified scheduler for performing the task by the at least one satellite asset.

20 Claims, 9 Drawing Sheets

(56) References Cited

U.S. PATENT DOCUMENTS

2020/0019435 A1     1/2020   Stevenson et al.
2021/0036767 A1*   2/2021   Devaraj ............ H04B 7/18515

OTHER PUBLICATIONS

International Search Report dated Jun. 22, 2021 in connection with International Patent Application No. PCT/US2021/021408, 4 pages.
Written Opinion of the International Searching Authority dated Jun. 22, 2021 in connection with International Patent Application No. PCT/US2021/021408, 6 pages.

* cited by examiner

SYSTEM AND METHOD FOR SATELLITE CONSTELLATION MANAGEMENT AND SCHEDULING

TECHNICAL FIELD

This disclosure is generally directed to satellite systems. More specifically, this disclosure is directed to a system and method for satellite constellation management and scheduling.

BACKGROUND

The space market is evolving rapidly as the cost of entry to space continues to drop. As the costs of space vehicles and launches continue to decline, the market is shifting to ever larger constellations and enabling more international access to space. Additionally, on-board computational power continues to increase, which enables increasing vehicle autonomy. Current satellite collection mission management systems operate by using very fine grain vehicle models and weigh the priority of a data collection (such as images, temperature readings, and the like) against the opportunities and costs (such as vehicle resources) for collection. However, such systems do not easily scale to accommodate large constellations (such as greater than thirty vehicles). Moreover, such systems do not accommodate increasing vehicle autonomy and collaboration with third party systems.

SUMMARY

This disclosure relates to a system and method for satellite constellation management and scheduling.

In a first embodiment, a method includes receiving request information obtained from an external user. The request information is associated with a task to be completed by at least one satellite asset among a plurality of satellite assets, where the satellite assets are grouped into a plurality of constellations and each of the constellations is associated with a corresponding scheduler among a plurality of schedulers. The method also includes assigning the task to a queue. The method further includes determining at least one specified scheduler to schedule the task at the at least one satellite asset. In addition, the method includes sending instructions to the at least one specified scheduler for performing the task by the at least one satellite asset.

In a second embodiment, a system includes a plurality of schedulers configured to schedule a plurality of satellite assets. Each scheduler is associated with a corresponding constellation, where each constellation includes a group of the satellite assets. The system also includes a constellation manager configured to receive request information obtained from an external user. The request information is associated with a task to be completed by at least one satellite asset among the plurality of satellite assets. The constellation manager is also configured to assign the task to a queue. The constellation manager is further configured to determine at least one specified scheduler to schedule the task at the at least one satellite asset. In addition, the constellation manager is configured to send instructions to the at least one specified scheduler for performing the task by the at least one satellite asset.

In a third embodiment, a non-transitory computer readable medium contains instructions that when executed cause at least one processor to receive request information obtained from an external user. The request information is associated with a task to be completed by at least one satellite asset among a plurality of satellite assets, where the satellite assets are grouped into a plurality of constellations and each of the constellations is associated with a corresponding scheduler among a plurality of schedulers. The non-transitory computer readable medium also contains instructions that when executed cause the at least one processor to assign the task to a queue. The non-transitory computer readable medium further contains instructions that when executed cause the at least one processor to determine at least one specified scheduler to schedule the task at the at least one satellite asset. In addition, the non-transitory computer readable medium contains instructions that when executed cause the at least one processor to send instructions to the at least one specified scheduler for performing the task by the at least one satellite asset.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
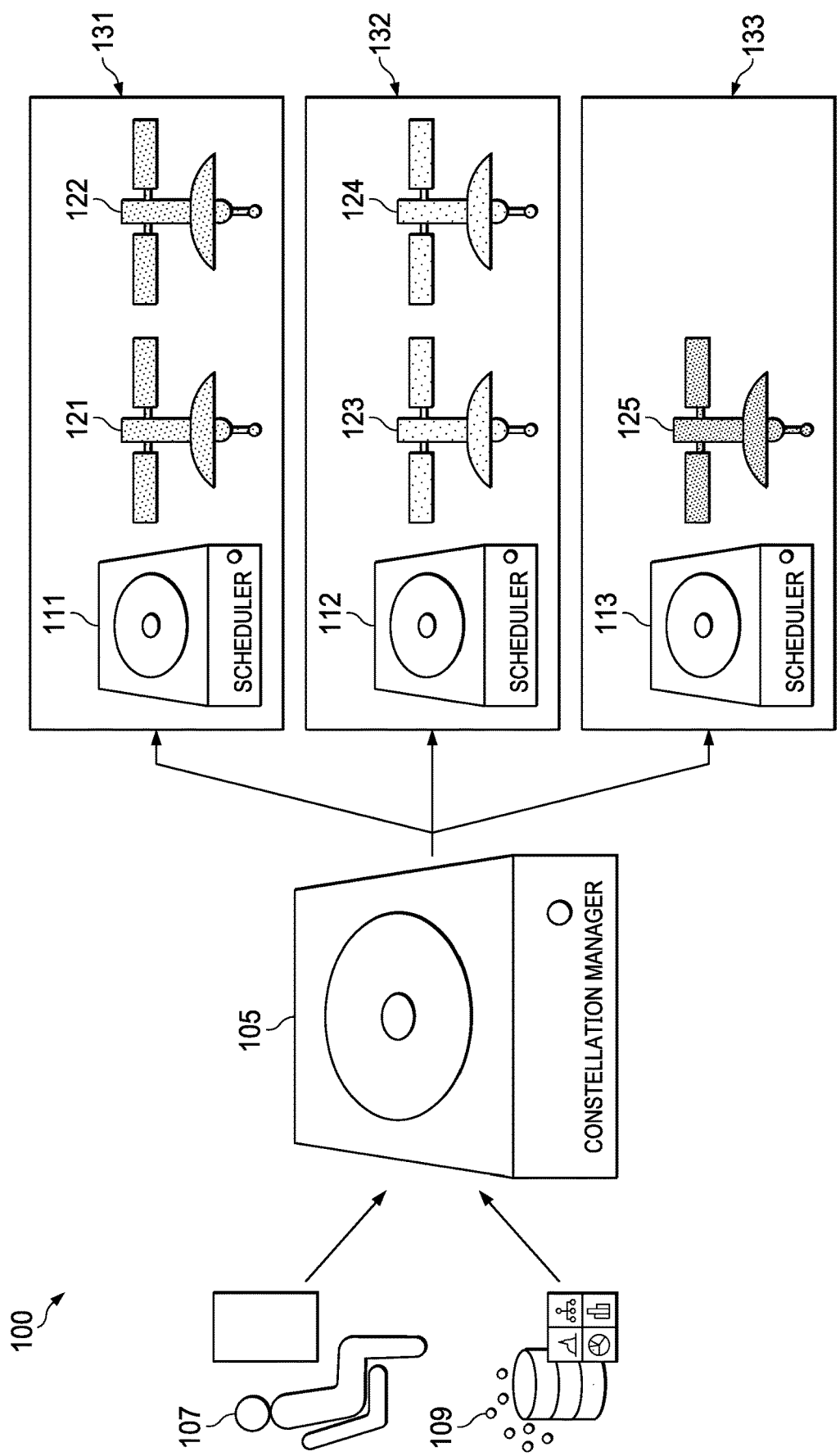
FIG. 1 illustrates an example system for constellation management and scheduling according to this disclosure.

FIGS. 1 through 10, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Satellite asset control and management is changing as stakeholders move away from small or monolithic satellite constellations into multi-class, large-asset constellations. Small satellites are changing management requirements as dozens to hundreds (or even thousands) of satellites will be in orbit. In order to have multiple heterogeneous satellites fly together while performing collaboration and coordination between individual assets and constellations, satellite constellation management is required.

Most current systems heavily rely on a scheduler itself to solve these issues. However, as the number of assets increases, a scheduler's performance is not sufficient to manage the number of assets it is flying, and breaking up the assets among more schedulers requires higher level coordination of the schedulers. As constellation assets become dispersed and shared among multiple entities and/or provide on-orbit computation for scheduling, downlinking and/or processing, the current hierarchical paradigm no longer works. In addition, new satellite systems are moving what was previously ground-based functionality to on-board processing. With that shift, ground stations no longer have exclusive control over the state of a spacecraft. This leads to uncertainty in the scheduling problems that need to be solved, and satellite behavior is no longer assured with this uncertainty.

To address these and other issues, this disclosure provides systems and methods for satellite constellation management and scheduling. In some embodiments, the satellite constellation management and scheduling may include a centralized hierarchical approach that uses a master constellation manager in front of individual schedulers, and the constellation manager optimizes data collection value across heterogeneous collection platforms. In other embodiments, the satellite constellation management and scheduling may include a decentralized approach in which a constellation manager does not assume that data collections will be scheduled as directed but instead continually balances probabilities of collection with a worth measurement of the collection. While the embodiments described in this disclosure are in the context of satellite systems, the disclosure is not limited thereto. The principles of this disclosure can also be applicable in other domains.

For further understanding of this disclosure, some definitions will now be provided. As used here, "constellation management" refers to a process of controlling assets for tasking with the goal of maximizing overall tasking worth and minimizing cost or risk. "Worth" refers to an equation or value that provides a weighted numeric ranking for a collection calculated as a score or value. "Score" may include one or more parameters such as priority, geometric and lighting conditions, anticipated quality, achieving desired over required thresholds and the like. "Cost" may include one or more parameters such as fuel consumption, time to achieve a collection, battery usage, file size, thermal exposure or other consumables. "Continuous" refers to an algorithm or process that runs continuously as tasking changes, as opposed to in a batch mode. "Dynamic" refers to an approach that enables collection worth to be performed based on the current state of the collection satellite, and the worth of subsequent collections change and are updated as collections are added to a particular scheduling solution. "Deterministic" indicates that a single ground segment fully controls what is uplinked to the constellation and can determine the actions of each vehicle through vehicle plans and telemetry. "Non-deterministic" indicates that a single ground segment does not determine all constellation commanding and does not determine the actions of each vehicle. "Controlled" indicates that knowledge of exact vehicle behavior is known prior to successful vehicle uplink. "Uncontrolled" indicates that knowledge of exact vehicle behavior may not be known prior to successful vehicle uplink. "Task" indicates a requested output from the satellite system with certain qualities and constraints. "Opportunity" indicates a period of time where all constraints are met to partially or fully satisfy a task. "Operation" indicates a single instance in time where a satellite is in a specific configuration and position to satisfy a task.

FIG. 1 illustrates an example system 100 for constellation management and scheduling according to this disclosure. As shown in FIG. 1, the system 100 includes a constellation manager 105 that manages collection operations performed by multiple satellite vehicles 121-125, which may also be referred to as "satellite assets" or simply "assets." The constellation manager 105 uses multiple schedulers 111-113 to manage the operations of the satellite assets 121-125. Note, however, that other combinations and arrangements of components may also be used here.

The constellation manager 105 manages the satellite assets 121-125 based on information received from a user group 107 and a data pool 109. The user group 107 represents one or more users or requesters that generate or provide requests for collections or other tasks to the constellation manager 105. The user group 107 includes any type of entity that has interest in receiving information received during a collection and may include customers, clients, corporate internal groups or divisions, political entities (such as government bodies), research or academic bodies, or the like.

The data pool 109 represents input or output data information that is relevant to the collection of data by the satellite asset 121-125. In some embodiments, the data pool 109 can include task information, weather information, support data, communication information, reporting or commanding information, or the like. The data pool 109 can be stored in one or more data stores (such as a database) and can be received by the constellation manager 105, output by the constellation manager 105, or both depending on the specific information.

The schedulers 111-113 perform scheduling operations for the satellite assets 121-125, which are grouped in multiple constellations 131-133. Each constellation 131-133 and satellite asset 121-125 is assigned to one scheduler 111-113. The schedulers 111-113 are located in the asset's command and control system (on the ground or in space) and are disposed close enough to their corresponding constellation 131-133 that communication between each scheduler 111-113 and its constellation 131-133 is consistent and regular regardless of orbital position of the constellation 131-133 or the scheduler 111-113. In some embodiments, each scheduler 111-113 may be disposed at, on, or within one of its satellite assets 121-125. Each scheduler 111-113 does not typically coordinate with the other schedulers 111-113.

The constellation manager 105 communicates with the schedulers 111-113 and manages the combination of constellations 131-133 and satellite assets 121-125 in such a way as to obtain the maximum worth of the performed collections. In addition, the constellation manager 105 is capable of supporting the discovery and loss of the schedulers 111-113 in real-time. Through the schedulers 111-113, the constellation manager 105 can coordinate across all satellite assets 121-125 under control. While FIG. 1 shows three schedulers 111-113, three constellations 131-133, and five satellite assets 121-125, this is merely one example. Other embodiments may include other numbers of schedulers, constellations, and satellite assets.

Based on the tasking inputs received from the user group 107 and the data pool 109, the constellation manager 105 allocates tasks (which can include data collection and filtered opportunities) across all of the satellite assets 121-125. In some cases, a single task may require hundreds of satellite operations to satisfy the task. Also, in some cases, it may not be possible to perform such a large number of satellite operations with a single satellite 121-125 or constellation 131-133.

The constellation manager 105 includes any suitable structure for managing collections using one or more constellations of satellite assets. The constellation manager 105 may, for example, include one or more applications, algorithms, or software that function as a true independent layer of a planning and scheduling hierarchy of decisions. In some embodiments, the system 100 uses a centralized hierarchical approach, and the constellation manager 105 operates as a master constellation optimizer that issues directive tasks to the individual schedulers 111-113. In other embodiments, the system 100 uses a decentralized approach in which the constellation manager 105 issues suggestions to the schedulers 111-113 but does not assume that tasks will be scheduled as suggested. The centralized and decentralized approaches are described in greater detail below.

In some embodiments, the constellation manager 105 controls filtering logic on both an asset-by-asset basis and an opportunity-by-opportunity basis to reduce the magnitude of an overall decision tree. Opportunity filtering by the constellation manager 105 allows for faster scheduling. In particular embodiments, the constellation manager 105 uses universal worth calculations across the schedulers 111-113, which may be different or include different types of satellite assets 121-125.

The system 100 is scalable and can support as many satellite assets 121-125 as computing resources allow. In contrast to some current systems that use a master resource scheduler that requires detailed and complex knowledge of individual asset schedulers, the constellation manager 105 provides a management system with a layer of abstraction that can both scale and accommodate different asset classes with varying availability. In particular, the operations performed by the constellation manager 105 may be independent of individual satellite constraints.

Although FIG. 1 illustrates one example of a system 100 for constellation management and scheduling, various changes may be made to FIG. 1. For example, the system 100 may include any number of constellation managers 105, user groups 107, data pools 109, schedulers 111-113, satellite assets 121-125, or constellations 131-133. Also, while FIG. 1 illustrates one example operational environment in which constellation management and scheduling is performed, this functionality may be used in any other suitable system.

Figure 2:
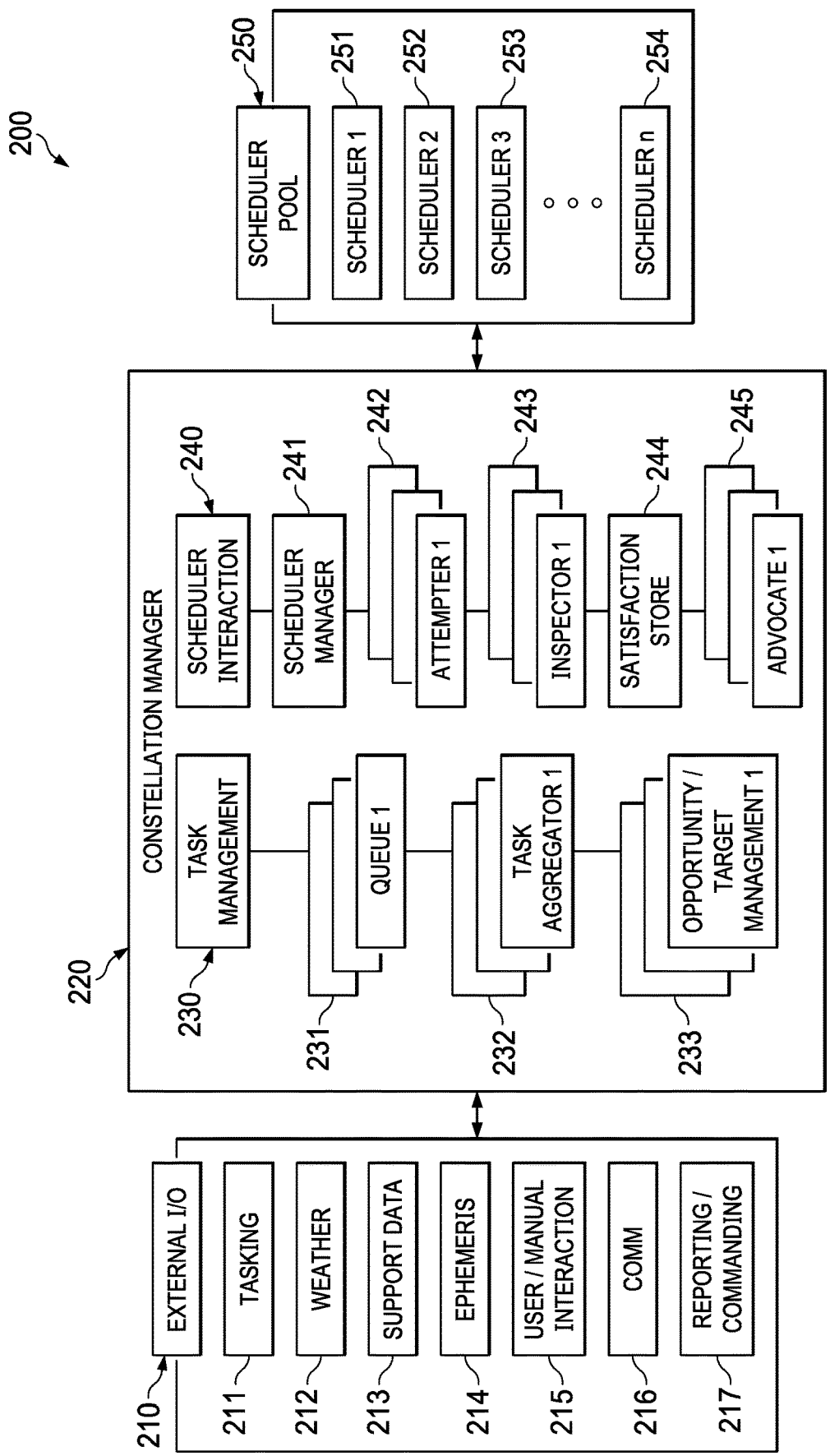
FIG. 2 illustrates an example functional architecture for centralized constellation management and scheduling according to this disclosure.

FIG. 2 illustrates an example functional architecture 200 for centralized constellation management and scheduling according to this disclosure. For ease of explanation, the architecture 200 of FIG. 2 may be used in conjunction with the system 100 of FIG. 1. However, the architecture 200 may be used in any other suitable system(s).

As shown in FIG. 2, the architecture 200 includes an external input/output (I/O) block 210 and a constellation manager 220. The constellation manager 220 receives information from or sends information to the I/O block 210. Using the information from the external I/O block 210, the constellation manager 220 manages a scheduler pool 250.

The scheduler pool 250 includes a group of schedulers 251-254 for control of satellite assets as discussed in greater detail below.

The external I/O block 210 includes external data that can be obtained from a variety of sources and in a variety of formats. The external data is used by the schedulers 251-254 for control of the satellite assets, such as the satellite assets 121-125 of FIG. 1. The external data can include tasking data 211, weather data 212, support data 213, ephemeris data 214, user/manual interaction data 215, communication data 216, and reporting/commanding data 217.

The tasking data 211 includes data associated with tasks that are performed by the satellite assets, such as tasks to fulfill requests for collection of data. The weather data 212 includes local or global weather information (such as temperature, cloud cover, and the like) that may affect the ability of the satellite assets to fulfill requests for collection of data. The support data 213 includes any support information (such as asset technical specifications, interference time periods, telemetry updates for power, momentum, and the like) that can be used by the schedulers 251-254 to support the tasks that are performed by the satellite assets. The ephemeris data 214 represents information of a satellite asset's predicted location over time based on its current location and trajectory. The user/manual interaction data 215 represents information associated with external users, which may be part of the user group 107. Communication data 216 includes technical data (such as network protocols, command paths, and throughput) associated with communication between the satellite assets and the ground, and availability and assignment of those assets for use in satellite communications. Reporting/commanding data 217 includes uplink and downlink communication information (such as feedback information) that can be used for reassigning tasks in the event of a communication interruption between ground and a satellite asset or fault in the ground or satellite system.

The external I/O block 210 handles inputs from external sources (such as requests from the user group 107), including tasking, outages, calibrations, and the like. The schedulers 251-254 may have no control or autonomy of input information to the external I/O block 210 in order to maximize responsiveness. In some embodiments, the external I/O block 210 collects and stores the external data and, when needed, provides the external data to the constellation manager 220. The external I/O block 210 can also distribute data from the schedulers 251-254 back to external entities.

The constellation manager 220 performs multiple task management functions 230 and controls scheduler interaction 240 for completion of the tasks. In some embodiments, the constellation manager 220 represents the constellation manager 105 of FIG. 1. In the centralized architecture 200, the constellation manager 220 oversees all scheduling operations of the schedulers 251-254. That is, the schedulers 251-254 are fully deferential to the decisions made by the constellation manager 220. As discussed in greater detail below, the constellation manager 220 can speed up task scheduling for the schedulers 251-254 by enabling opportunity filtering.

Within the task management functions 230 of the constellation manager 220 are one or more queues 231, one or more (optional) task aggregators 232, and one or more (optional) opportunity/target management blocks 233. The queues 231 may represent the central point for incoming tasks for the schedulers 251-254. The constellation manager 220 receives tasks from the external I/O block 210 and assigns each task to a queue 231 to be considered by one of the schedulers 251-254. All tasks, even mandatory items like communication plan incorporation or updates for telemetry values, are assigned to a queue 231 before completion of the task. In some embodiments, the task aggregators 232 and the opportunity/target management blocks 233 may be performed at the scheduler level with less autonomy at the constellation manager 220.

The queues 231 can include different types of queues, such as a normal task queue 231, a priority queue 231, and an outage queue 231. An outage queue 231 can process tasks associated with component outages, such as a satellite asset that goes offline. A priority queue 231 can process ad hoc, high priority tasks (such as an important customer collection request) that should take precedence over standard scheduled tasks. A normal task queue 231 is for other types of tasks that are processed "normally." The different types of queues 231 have relative priority to each other. For example, the outage queue 231 can have a higher priority than the priority queue 231, which can have a higher priority than the normal task queue 231.

The queues 231 may be independent of each other and may not duplicate tasks across each other. The constellation manager 220 can include a logic engine that determines in which queue 231 each task is placed. In general, the logic engine operates to group related tasks together in the queues 231. When the constellation manager 220 adds a task to a queue 231, the constellation manager 220 may give a score to the task that is unique to the queue 231 and then place the task in a queue order that is relative to its score. In some cases, a task in a queue may have prerequisite tasks that should be performed before the task is attempted, and an indication of the prerequisite tasks can be stored in the queue 231 with the task.

Each task aggregator 232 operates to aggregate tasks when possible. For example, when a task is in a queue 231 and is ready to be scheduled, the task aggregator 232 looks for multiple tasks that may be combined in the queue 231 into a single task item. In some embodiments, the task aggregator 232 may even look across multiple queues 231 to combine different tasks. When tasks are combined into a single task item, the combined task item can be processed like a single task, but the combined task item may have the metadata of all of its component tasks. In some embodiments, the combined task item is rescored and may change position in the queue 231 or may move to a new queue 231. Also, in some embodiments, the task aggregator 232 can query a satisfaction store 244 to see if a task is satisfied by an existing planned or completed task. The satisfaction store 244 contains a master list of satisfied requests. If the task is satisfied, the task aggregator 232 updates the satisfaction store 244 and removes the task from the queue 231.

The opportunity/target management blocks 233 are pooled, scalable resources that perform work on tasks assigned to a queue 231. The opportunity/target management blocks 233 may perform pool management to give all queues 231 some preferred resources but enable overall sharing across the pool. Logic implemented by the opportunity/target management blocks 233 can be based on relative queue priority and depth of work completed in each queue 231. For example, if a high priority queue 231 has already completed 25 tasks out of 100 assigned tasks, the opportunity/target management blocks 233 may work on a task at or near the top of a lower priority queue 231 (since the high priority queue 231 is well on its way to being completed). This may be useful since the queues 231 need not have knowledge of relative capacity of each other.

Another example function of the opportunity/target management blocks 233 is to map tasks that are not already asset-specific to satellite assets that can perform the tasks. The opportunity/target management blocks 233 have knowledge of which satellite assets have the right capabilities and are in the right places to perform each task. To maintain this knowledge, the opportunity/target management blocks 233 can receive ephemeris updates and updates of satellite asset and scheduler capabilities, which can be enhanced or degraded over time. For certain asset-specific tasks, such as a specific calibration or outage request, use of the opportunity/target management blocks 233 can be bypassed.

The constellation manager 220 controls scheduler interaction 240 for completion of the tasks in the queues 231. The constellation manager 220 includes a scheduler manager 241 to manage the scheduler interaction 240. The scheduler manager 241 manages one or more attempters 242, one or more inspectors 243, the satisfaction store 244, and one or more advocates 245.

The scheduler manager 241 can reference a master list of asset-to-scheduler mappings. The scheduler manager 241 may distribute scheduler tokens for use in schedule attempts and can maintain a wait list based on the priority of each attempter request. The tokens can be temporal, as well, if the schedule supports it. Such details can be provided on scheduler startup. Tasks associated with outages may be given a higher place in the wait list than collection tasking or other tasks. The scheduler manager 241 also maintains temporal and geographical compliance for each satellite asset.

Each attempter 242 pulls a task off a queue 231 and tries to schedule the task. The attempters 242 may operate to make scheduling attempts as fast as possible by reducing opportunities and schedulers. As used here, an opportunity indicates a period of time where all constraints are met to partially or fully satisfy a task. The attempters 242 can include logic to understand the capabilities of each satellite asset and may use the logic to attempt scheduling on a capable asset in a least contested time. In some cases, to schedule a task, the attempter 242 first decides which satellite assets will perform the attempt initially. Next, the attempter 242 requests an attempt token from the scheduler manager 241, and the scheduler manager 241 returns a list of schedulers 251-254 for the assets and an order of the schedulers 251-254 in the attempt line. When a scheduler 251-254 is at the front of the attempt line, the scheduler 251-254 returns a token. Next, for the schedulers 251-254 that have a token, the attempter 242 attempts to schedule some portion of the opportunities. While waiting for tokens, the attempter 242 can query the satisfaction store 244 to determine more likely opportunities. The satisfaction store 244 can be also queried to view a moderately detailed plan of each scheduler 251-254. The attempter 242 can also defer tokens if the attempter 242 has enough open attempts with current schedulers 251-254. Next, the scheduler(s) 251-254 return a schedule status (such as yes or no), the worth of the attempt, and any other tasks that the scheduler 251-254 had to remove to schedule the instant task.

It is noted that, at this point, multiple schedulers 251-254 may have the task planned, and the attempter 242 can determine if the current responses from the schedulers 251-254 are acceptable. The attempter 242 then selects one of the schedulers 251-254 for task completions and directs the other schedulers 251-254 to undo the attempt. The attempter 242 then passes a success acknowledgement back to the queue 231, which deletes the task. Any uncompleted tasks that are removed by a scheduler 251-254 can be passed back to the logic engine of the constellation manager 220 to be added again to a queue 231. If there is a failure or if the attempter 242 times out waiting for a token, the attempter 242 returns a failure acknowledgement back to the queue 231.

The inspectors 243 are pooled resources that are sized proportionately to the number of collections that need to be coordinated across the schedulers 251-254. The inspectors 243 perform quality assurance on the individual schedules. As tasks are shifted around among the schedulers 251-254, the inspectors 243 ensure that constraints associated with system requirements are maintained across the schedulers 251-254. For example, the inspectors 243 can perform assurance on items like weather and geometric constraints. The inspectors 243 can also send failed constraint tasking back to the queues 231 for deletion and rescheduling. Each advocate 245 is a type of scheduler that is responsible for external format and content compliance. The advocate 245 communicates scheduler needs and completed work back to external entities.

The scheduler pool 250 represents a pool of schedulers 251-254 that operate to schedule each satellite asset, such as described in FIG. 1. The schedulers 251-254 are capable of performing work on a task-by-task capacity (as opposed to a batch scheduler). The schedulers 251-254 operate quickly such that, in some embodiments, the schedulers 251-254 can perform basic scheduling attempts in less than 0.1 second. The schedulers 251-254 can be divided up temporally or geographically for an asset or group of assets. On startup, the schedulers 251-254 provide the scheduler manager 241 with a list of satellite assets and timeframes, as well as geographic information for each asset (such as a world view asset operating Tuesday thru Thursday). The schedulers 251-254 provide control of each asset and its schedule and can move tasks around between assets as new attempts are made. In some embodiments, the schedulers 251-254 may have autonomy to auto-schedule calibrations as necessary for collection tasks. Also, in some embodiments, the schedulers 251-254 can generate and format output (such as task reports) and communication requests in a suitable external format.

For better understanding, the following example illustrates the architecture 200 performing centralized constellation management and scheduling operations. Initially, a new task T1 is input from the external I/O block 210 to the constellation manager 220. In this example, it is assumed that task T1 is "schedule a cloud-free collection of a particular location of the ocean sometime in the next three days." Based on the logic engine, the constellation manager 220 adds task T1 to a queue 231 (in this example, Queue 4) and places task T1 in position 6 in Queue 4. In response to task T1, the opportunity/target management blocks 233 create opportunities based on available and capable assets, adds metadata to the task T1, and marks task T1 ready to schedule in Queue 4. An open attempter 242 sees task T1 is high enough in Queue 4 for scheduling and requests two schedulers 251 and 253 for an attempt based on the opportunities. The scheduler 251 controls an asset that passes over the ocean location during the day and would use the least amount of resources to perform the collection. The scheduler 253 controls an asset that would perform the collection at a higher resolution (i.e., increasing collection score) but would use more resources to do so (i.e., increasing collection cost). Depending on the logic, task T1 may be scheduled by the scheduler 251, by the scheduler 253, or by both schedulers 251 and 253. Here, it is assumed that the scheduler manager 241 returns a token for the scheduler 251 to the attempter 242. The scheduler 251 successfully schedules task T1 and reports back to the attempter 242 with a score of six. Based on the score, the attempter 242 cancels the request for the scheduler 253 and removes task T1 off Queue 4 as successfully scheduled. The satisfaction store 244 is updated with the attempt information, and the external users are notified on the scheduling of task T1 through the reporting/commanding data 217.

Although FIG. 2 illustrates one example of a functional architecture 200 for centralized constellation management and scheduling, various changes may be made to FIG. 2. For example, the architecture 200 may include any number of each component shown. Also, components may be deleted or arranged in a different order, and additional components may be added according to particular needs.

Figure 3:
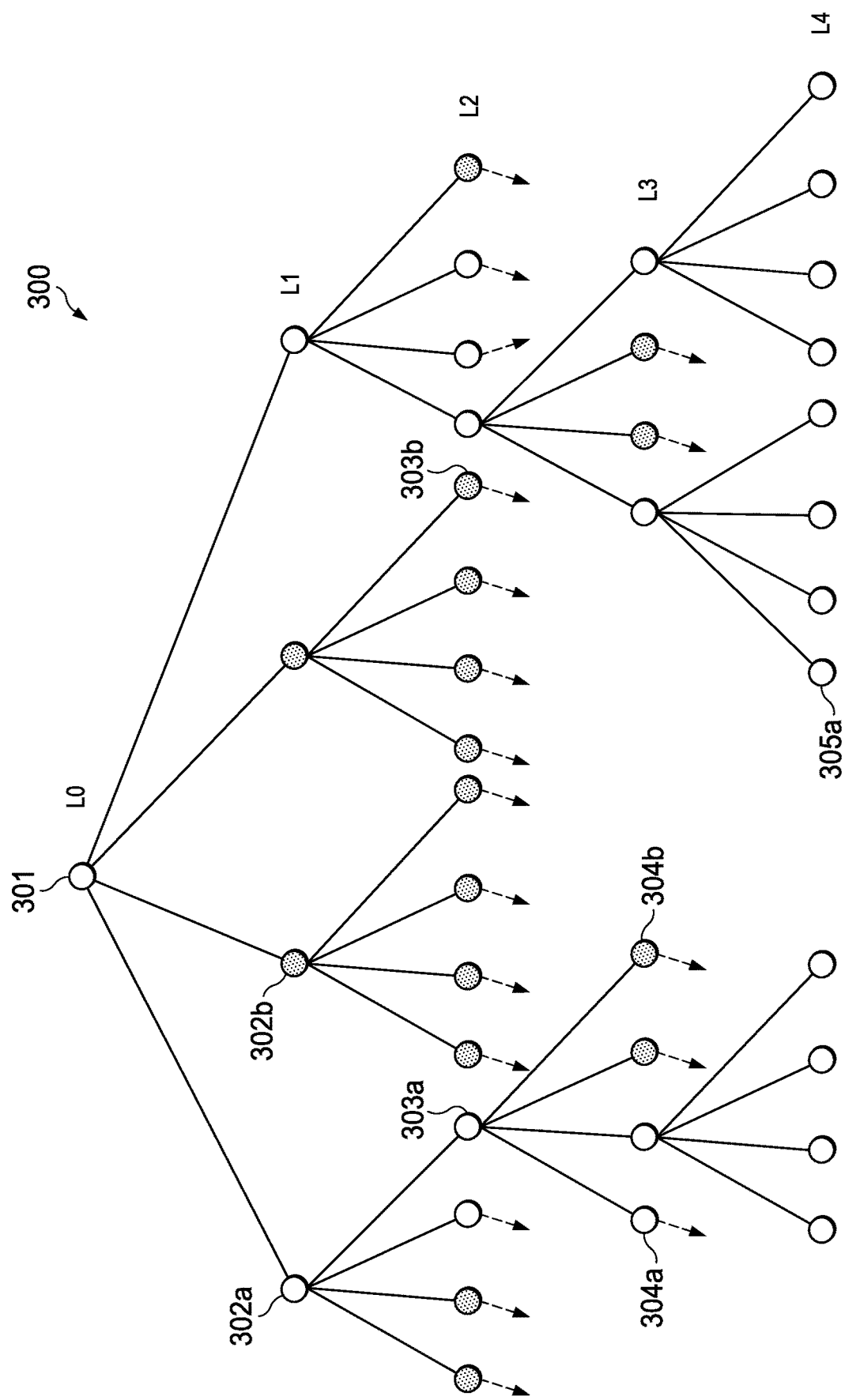
FIG. 3 illustrates an example decision tree for task scaling using centralized constellation management according to this disclosure.

FIG. 3 illustrates an example decision tree 300 for task scaling using centralized constellation management according to this disclosure. For ease of explanation, the decision tree 300 may be described as being used in the architecture 200 of FIG. 2 and the system 100 of FIG. 1. However, the decision tree 300 may involve the use of any other suitable architecture(s) or system(s).

As shown in FIG. 3, the decision tree 300 includes multiple nodes 301, 302a-302b, 303a-303b, 304a-304b, 305a arranged at different levels. Some of the nodes are light nodes 302a, 303a, 304a, 305a and some of the nodes are dark nodes 302b, 303b, 304b. Differences between the nodes 302a-302b, 303a-303b, 304a-304b, 305a are discussed below. Level L0 represents a constellation manager, such as the constellation manager 220 of FIG. 2 (and indicated by the node 301 in FIG. 3). Level L1 represents a pool of schedulers (such as the schedulers 251-254 of FIG. 2) that are controlled by the constellation manager 220. In the decision tree 300, there are four schedulers represented by four nodes 302a-302b, although other embodiments may include a different number of schedulers. Level L2 represents satellite assets that are controlled by the schedulers in level L1. In the decision tree 300, there are sixteen satellite assets represented by sixteen nodes 303a-303b, although other embodiments may include a different number of satellite assets.

Level L3 represents possible opportunities by a satellite asset to fulfill a task request. Each opportunity represents a time and condition(s) where a particular collection by a particular satellite asset is possible. For example, if the requested collection is ocean temperature data near Florida, an opportunity for satellite asset A includes times when satellite asset A is in range of Florida and conditions that make collection possible (such as minimal cloud cover) are present. Level L4 represents possible satellite operations for collection during a particular opportunity. Satellite operations correspond to settings, orientations, or other characteristics or parameters of the satellite asset for a particular collection attempt. For instance, during an opportunity for satellite asset A to perform a collection of ocean temperature data near Florida, there may be various particular camera settings, satellite orientations, and the like that allow satellite asset A to perform the collection. In the decision tree 300, each satellite asset has four opportunities (represented by nodes 304a-304b) and four satellite operations per opportunity (represented by nodes 305a), although other embodiments may include a different number of opportunities and satellite operations.

Without centralized decision making, to ensure maximum worth in the collection, it would be necessary to schedule 16 (satellite assets)×4 (opportunities)×4 (satellite operations) =256 different items to choose an actual collection. For systems with more schedulers and more satellite assets (such as hundreds or thousands), the decision tree 300 would be dramatically larger, and the overall time for decision making would increase greatly. However, in FIG. 3, the constellation manager (such as an attempter 242 of the constellation manager 220) filters the assets chosen to just two schedulers and five assets and only two opportunities per asset. The constellation manager can reduce the list of possible schedulers, satellite assets, opportunities, and satellite operations by considering various properties, characteristics, or conditions that make collection unlikely, undesirable, or impossible using certain schedulers, satellite assets, opportunities, and satellite operations.

In some embodiments, the constellation manager can execute one or more rules engines or machine learning algorithms to make decisions associated with decision tree reduction. For example, weather can be one condition that the constellation manager may consider. Continuing the earlier example, if cloud cover over Florida is significant, there may be only a small subset of the total number of satellite assets that can accurately collect ocean temperature information when clouds are present. In such a case, other satellite assets can be removed from the selection process. As another example, camera or sensor resolution may be another consideration. That is, in some cases, there may be only a subset of satellite sensors with resolution high enough to perform the desired collection. In such a case, other satellite assets can be removed from the selection process.

The dark nodes 302b, 303b, 304b represent schedulers, satellite assets, opportunities, and satellite operations that have been filtered out of the selection process by the constellation manager. The light nodes 302a, 303a, 304a, 305a represent schedulers, satellite assets, opportunities, and satellite operations that satisfy the selection process (meaning they "make the cut") by the constellation manager. As shown in the decision tree 300, only two of the schedulers and five of the satellite assets satisfy the selection process and are represented by light nodes 302a and 303a, respectively. Only two opportunities for each of those five satellite assets satisfy the selection process and are represented by light nodes 304a (although, for ease of illustration, not every node is shown in FIG. 3). For each opportunity that satisfies the selection process, all four satellite operations satisfy the selection process (represented by light nodes 305a). Thus, in FIG. 3, the centralized decision making by the constellation manager creates a tree size of 5 (satellite assets)×2 (opportunities)×4 (satellite operations)=40 different items, which is just 16% of the overall maximum tree size of 256 items. Reducing the size of the decision tree 300 serves to increase overall tasking speed and responsiveness.

Although FIG. 3 illustrates one example decision tree 300 for task scaling using centralized constellation management, various changes may be made to FIG. 3. For example, the decision tree 300 may include any number of constellation managers, schedulers, satellite assets, opportunities, and satellite operations. Also, components may be deleted or arranged in a different order, and additional components may be added according to particular needs.

As satellite constellations evolve in the form of additional on-board processing for tasking decisions or processing, a decentralized constellation management architecture can provide some additional benefits over the centralized constellation management techniques described in FIGS. 2 and 3. For example, decentralized constellation management can address how to best utilize satellite assets and constellations despite state and use uncertainties and significantly less-than-perfect information due to gaps in communication. Additionally, the desire for multiple users engaging with the satellite assets, potentially or purposely without knowledge of the other users, can suggest a different strategy for optimization across the constellation. This is useful when users are independent from one another due to technical limitations (such as bandwidth, connectivity, and the like) or process limitations (such as user isolation). As users may not communicate with each other, state and schedule of the assets is fully managed on-board. That is, assets (or groups of assets) can self-manage tasking without ground intervention, which can provide protection against unauthorized or greedy users. A de-centralized architecture means that no one user or group can exert full control over the asset or the constellation. When distributed across multiple self-managing constellations or dedicated assets, decentralized constellation management can ensure task satisfaction across an equivalent asset base and can yield identical results or better than centralized constellation management while gaining the benefits of a decentralized system.

Decentralized constellation management expands upon the functional architecture 200 for centralized constellation management and scheduling as described in FIG. 2. In decentralized constellation management, the constellation manager does not assume that collections will be scheduled as directed but instead continually balances the probability of collection with the worth of the collection. The probability can be continuously updated in time based on feedback between the constellation manager and individual schedulers. This paradigm allows for the greatest satisfaction of collection across constellations that may not be under direct control of the constellation manager. Decentralized constellation management can take into account commercial resources, intermittent communications, autonomous collectors, and assets shared with other constellation managers.

In general, constellation management can be classified as deterministic or non-deterministic and can also be classified as controlled or uncontrolled. Here, control refers to control or management of the satellite asset by the ground. Traditionally, satellites require direct commanding of tasking, where the ground instructs the satellite what to do via commands. Some task items may be pre-loaded aboard the satellite (such as cruise altitude) and are referred to by the command load. Once the satellite runs out of commands, it will safe itself or enter a mode that guarantees a protected state. In contrast, satellite self-control is where the satellite does not get commands from the ground but instead receives an action request. The satellite maintains its own state and chooses which actions to perform, and multiple ground stations can contribute to the list of action requests. Table 1 illustrates constellation management systems using these classifications.

TABLE 1

Constellation Management Systems by Classification

|  | Deterministic | Non-Deterministic |
| --- | --- | --- |
| Controlled | Centralized | Centralized |
| Uncontrolled | Centralized | Decentralized |

An example of a controlled, deterministic system is a conventional scheduler system where a single ground resource dictates the exact command load and where the satellite asset makes no on-board decisions. An example of a controlled, non-deterministic system is one with multiple schedulers that share information between each other to implement requests from the other ground system. An example of an uncontrolled, deterministic system is one in which a single ground resource determines satellite asset behavior and responses, but the asset can also react to certain information in a predefined manner. An example of an uncontrolled, non-deterministic system is one with multiple schedulers where information sharing is not always possible and where the asset can make on-board decisions regarding its actions. As indicated in Table 1, decentralized constellation management is uncontrolled and non-deterministic. Centralized constellation management systems include the remaining cells of Table 1. Decentralized constellation management uses probabilistic event management and optimization to manage the likelihood of the system in achieving its objectives. This includes optimization of a multivariate probability function and a multivariate worth function. In some embodiments, this can also include optimization of a multivariate risk function.

Figure 4:
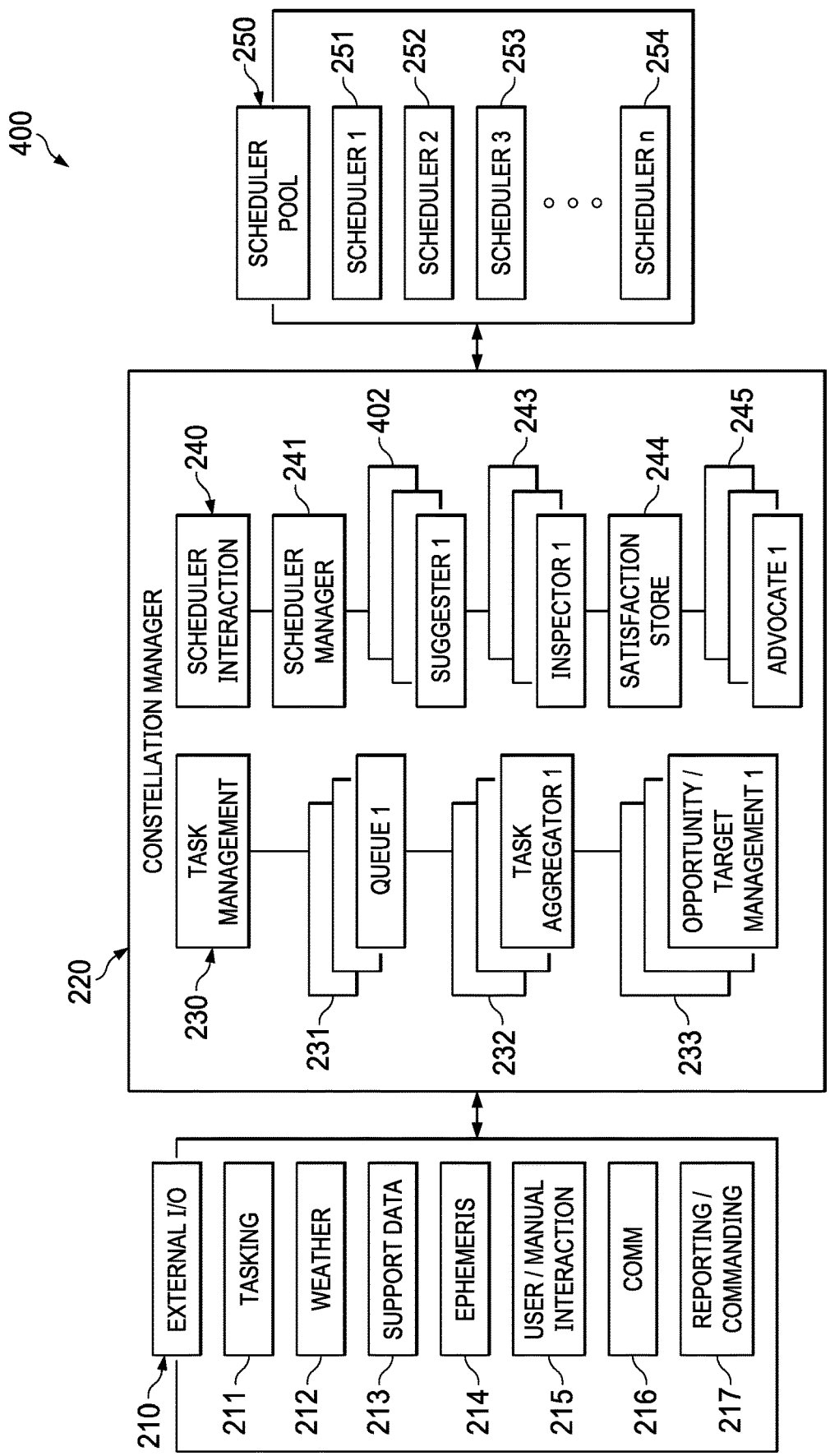
FIG. 4 illustrates an example functional architecture for decentralized constellation management and scheduling according to this disclosure.

FIG. 4 illustrates an example functional architecture 400 for decentralized constellation management and scheduling according to this disclosure. For ease of explanation, the architecture 400 of FIG. 4 may be used in conjunction with the system 100 of FIG. 1. However, the architecture 400 may be used in any other suitable system(s).

As shown in FIG. 4, the architecture 400 includes multiple components that are the same as or similar to corresponding components of the architecture 200. For example, in the architecture 400, the constellation manager 220 receives external data associated with task requests from the external I/O block 210. The constellation manager 220 processes the task requests, which are used by the schedulers 251-254 for control of the satellite assets (such as the satellite assets 121-125 of FIG. 1).

Instead of the attempter 242 of FIG. 2, which selects schedulers 251-254 for task completion, the constellation manager 220 of FIG. 4 includes one or more suggesters 402. Like the attempter 242, the suggester 402 is in communication with the schedulers 251-254 and provides instructions to the schedulers 251-254 for scheduling of tasks. However, while the instructions from the attempter 242 are commands that are followed by the schedulers 251-254, the instructions provided by the suggester 402 to the schedulers 251-254 are recommendations that can be (but do not have to be) followed by the schedulers 251-254. In the architecture 400, the schedulers 251-254 have autonomy to make decisions involving task scheduling. As the schedulers 251-254 schedule tasks, the schedulers 251-254 report the scheduling back to the suggester 402 so that the collection manager 220 can update queues 231, such as described with respect to FIG. 2.

In the context of tasks for collection of data, the suggester 402 does not assume that collections will be scheduled as directed but instead continually balances the probability of collection with the worth of the collection and the risk of the collection. The probability, worth, and risk of a collection can be represented as functions $P(x)$, $W(x)$, and $R(x)$, respectively. In these functions, x represents multiple variables, including uplink resource, downlink resource, collector asset, time interval, and other parameters that may be affected by time, such as geographic position of each vehicle or asset. These values can be continuously updated in time based on feedback between the suggester 402 and the individual schedulers 251-254.

The function $P(x)$ represents the probability of collection occurring for a given set of circumstances. The calculation of $P(x)$ takes into account the task priority and timeframe. The calculation also takes into account the capabilities of each constellation and satellite asset and the accessibility of each constellation and satellite asset, including geometry constraints and relative constellation grouping. Thus, $P(x)$ can vary greatly in the architecture 400, depending on its component variables. While determining $P(x)$ for a scheduled task may not be as important in a conventional system with a single scheduler/constellation pair, $P(x)$ is important in the architecture 400 in order to maintain an enterprise schedule that schedules tasks with the greatest worth.

The function $W(x)$ represents the worth of the collection. The overall goal in scheduling is to maximize overall worth by maximizing tasking value and responsiveness at a minimal cost of the collection. Here, cost may be measured in asset resources, such as time, integral constraint usage, and the like. In some embodiments, the calculation of $W(x)$ can also take into account quality measures of the collection.

The function $R(x)$ represents the risk of the collection, which is a measurement of possible loss, damage, or disruption of the satellite asset in service of performing the collection. The overall goal is to minimize risk. In some embodiments, the calculation of $R(x)$ takes into account the collection geometry of the satellite asset, the mission profile of the asset, and the location, conflict state, and orbital state of the asset.

In the architecture 400, the constellation manager 220 (particularly, the suggester 402) manages the $P(x)$, $W(x)$, and $R(x)$ for the entire system of satellite assets (a global $P(x)$, $W(x)$ and $R(x)$), and each of the schedulers 251-254 manages the $P(x)$, $W(x)$, and $R(x)$ for its own constellation of satellite assets (a local $P(x)$, $W(x)$, and $R(x)$). Each scheduler 251-254 operates to consider probabilistic events when scheduling tasking. Depending on the branch path chosen, certain tasking items may not be completed, due to that branch having higher priority items to do.

The constellation manager 220 may have different considerations than the schedulers 251-254 when deriving $W(x)$ values. For example, cost may be one consideration in determining $W(x)$. For the schedulers 251-254, cost may be derived from satellite asset usage and utilization of integral-type constraints. For example, everything else being equal, a task that requires two seconds for completion has twice the cost of a task that requires one second. Costs may include $R(x)$ values, as well, depending on mission content. For the constellation manager 220, cost may be derived from utilization of the schedulers 251-254. While the constellation manager 220 is not directly concerned with asset costs, the constellation manager 220 does consider the overall capabilities of the constellation that each scheduler 251-254 controls. In general, the goal of the constellation manager 220 is to maintain available capacity on assets with high capabilities.

The constellation manager 220 and the schedulers 251-254 can make other considerations for the calculation of $W(x)$. For the schedulers 251-254, worth may also be derived from optimizing geometric constraints, weather constraints, and quality constraints. For an image collection, the schedulers 251-254 may try to obtain the most cloud-free, best angled, least smear image. As an example, everything else being equal, an image that is 90% cloud free may have twice the worth of an image that is only 80% cloud free. For the constellation manager 220, worth may also be derived from minimizing duplicate collections, scheduling collections sooner, and with increasing probability. In general, the constellation manager 220 tries to minimize schedule thrashing (re-scheduling of already scheduled items) across the constellation and tries to collect items as soon as possible without duplication. As an example, everything else being equal, a scheduling of a collection with a single attempt may be worth twice as much as those requiring two attempts (and possible duplication).

The calculation of P(x), W(x), and R(x) for a given task can vary depending on the resources that are used to perform the task. One resource may be the uplink resource, which represents a ground-based resource, such as a terminal or relay, for executing an uplink to the satellite asset. A second resource may be the collector asset, which is the satellite asset that executes the task. A third resource may be the downlink resource, which represents a ground-based resource, such as a terminal or relay, for receiving a downlink from the satellite asset. Depending on the task or the implementation, the uplink resource and the downlink resource can be the same resource or can be different resources.

Although FIG. 4 illustrates one example of a functional architecture 400 for decentralized constellation management and scheduling, various changes may be made to FIG. 4. For example, the architecture 400 may include any number of each component shown. Also, components may be deleted or arranged in a different order, and additional components may be added according to particular needs.

Figure 5:
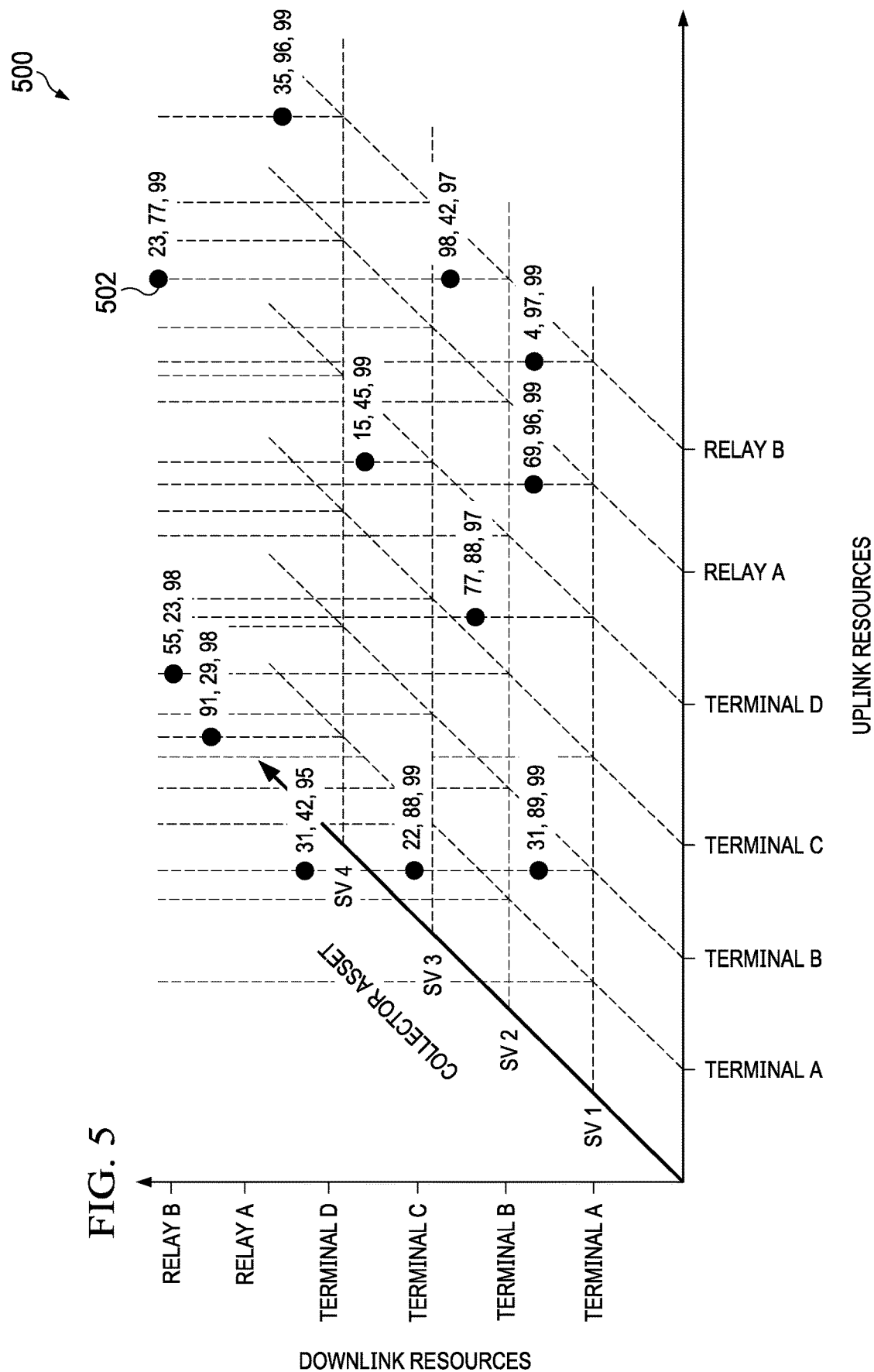
FIG. 5 illustrates an example chart showing dynamic scoring of scheduling parameters for use in decentralized constellation management according to this disclosure.

FIG. 5 illustrates an example chart 500 showing dynamic scoring of scheduling parameters for use in decentralized constellation management according to this disclosure. For ease of explanation, the chart 500 of FIG. 5 may be used in conjunction with the architecture 400 of FIG. 4 and the system 100 of FIG. 1. However, the chart 500 may involve the use of any other suitable architecture(s) or system(s).

As shown in FIG. 5, the X axis represents different possible uplink resources, the Y axis represents different possible downlink resources, and the Z axis represents different possible satellite collector assets (identified in FIG. 5 as "SV" for "space vehicle"). Each point 502 on the chart 500 represents a valid combination of uplink resource, downlink resource, and collector asset. For each point 502, there are three values determined for that combination. The first value is P(x), the second value is W(x), and the third value is R(x). The values are dynamic depending on time and status of a given resource. The values shown at each point 502 are locally optimized for a specific time interval within that combination. In other words, the values are the largest values that can be returned for that particular combination of uplink resource, downlink resource, and collector asset at that particular time interval. The values can be used by the constellation manager 220 and the schedulers 251-254 in the architecture 400 for selecting assets to perform tasks.

Although FIG. 5 illustrates one example chart 500 showing dynamic scoring of scheduling parameters for use in decentralized constellation management, various changes may be made to FIG. 5. For example, the chart 500 may include any number of uplink resources, downlink resources, and collector assets.

Figure 6:
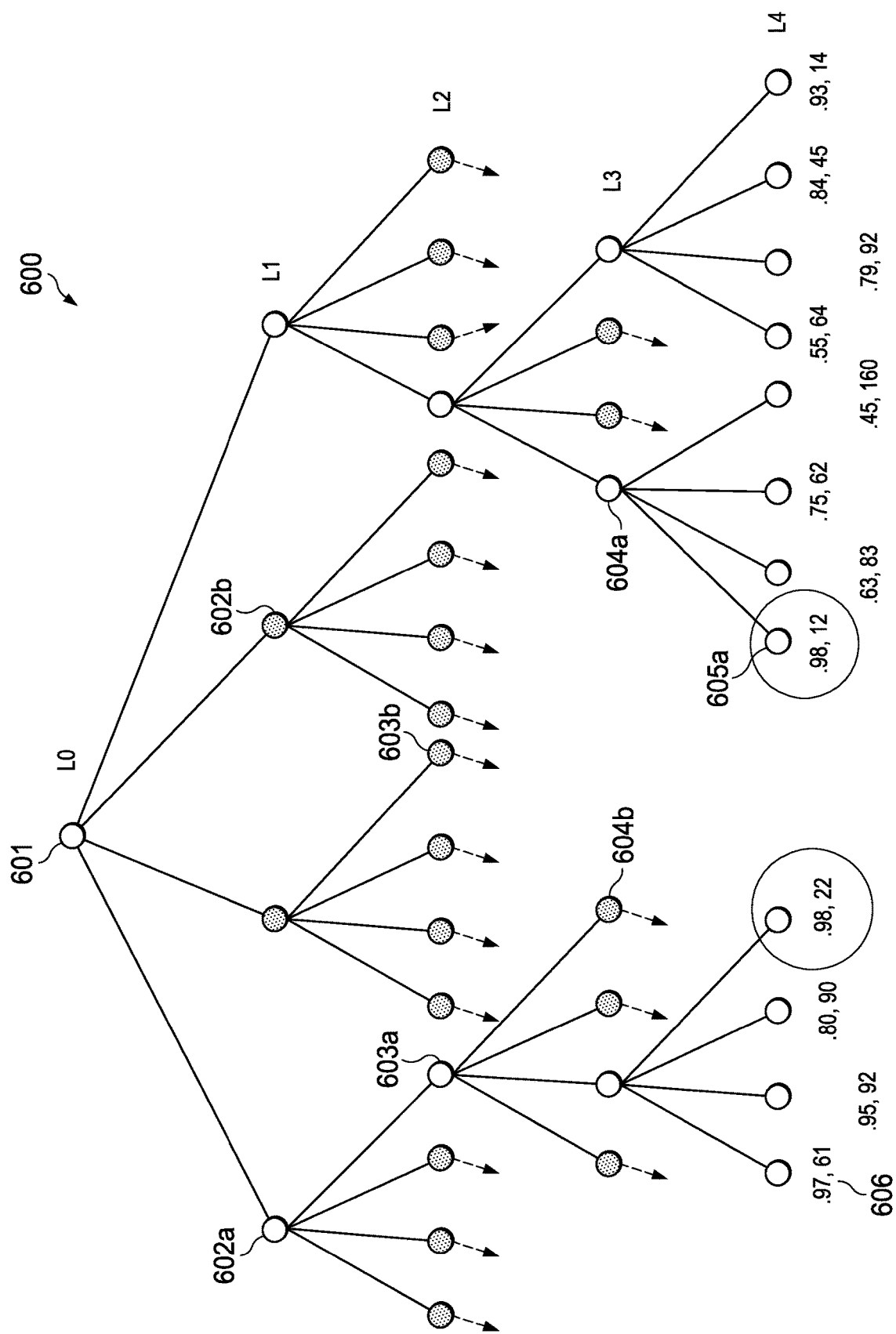
FIG. 6 illustrates an example decision tree for task scaling while maximizing probability of collection using decentralized constellation management according to this disclosure.

FIG. 6 illustrates an example decision tree 600 for task scaling while maximizing probability of collection using decentralized constellation management according to this disclosure. For ease of explanation, the decision tree 600 may be described as being used in the architecture 400 of FIG. 4 and the system 100 of FIG. 1. However, the decision tree 600 may involve the use of any other suitable architecture(s) or system(s).

As shown in FIG. 6, the decision tree 600 includes multiple levels L0 through L4 and multiple nodes 601, 602a-602b, 603a-603b, 604a-604b, 605a. The levels L0-L4 and the nodes 601, 602a-602b, 603a-603b, 604a-604b, 605a may be the same as or similar to corresponding levels and nodes in FIG. 3. The light nodes 602a, 603a, 604a, 605a represent schedulers, satellite assets, opportunities, and satellite operations, that satisfy the selection process. The dark nodes 602b, 603b, 604b represent schedulers, satellite assets, opportunities, and satellite operations that have been filtered out of the selection process.

For each node 605a at level L4, there is a value set 606 shown in FIG. 6. The value set 606 includes two values, namely a left value and a right value. The left value represents the probability P(x), and the right value represents the worth W(x) for the corresponding satellite operation. That is, each satellite operation shown in the decision tree 600 has a corresponding probability and worth calculated for the circumstances represented by the satellite operation. The probability for each satellite operation is determined based on the particular circumstances, conditions, or events that correspond to that satellite operation. As noted above, these can include the uplink resource, downlink resource, collector asset, time interval, and other parameters that may be affected by time. Each circumstance, condition, or event can affect the probability for that satellite operation.

The two satellite operations with the highest probability are circled in FIG. 6. While these two satellite operations have the same probability (0.98), they have different worth values (22 versus 12). Since the overall goal is to maximize probability of a task, the overall probability for a task can be increased by scheduling the task at multiple satellite operations. For example, each of the circled satellite operations has a probability of 0.98 for completing the task. If the task is scheduled at both of these satellite operations, the overall probability of the task being performed rises to 0.9996. The overall probability can be increased further by scheduling the task at additional satellite operations (such as three, four, or more satellite operations). However, maximizing probability without consideration for total worth may not be the most valuable option for the system.

Although FIG. 6 illustrates one example decision tree 600 for task scaling while maximizing probability of collection using decentralized constellation management, various changes may be made to FIG. 6. For example, the decision tree 600 may include any number of constellation managers, schedulers, satellite assets, opportunities, and satellite operations. Also, components may be deleted or arranged in a different order, and additional components may be added according to particular needs.

Figure 7:
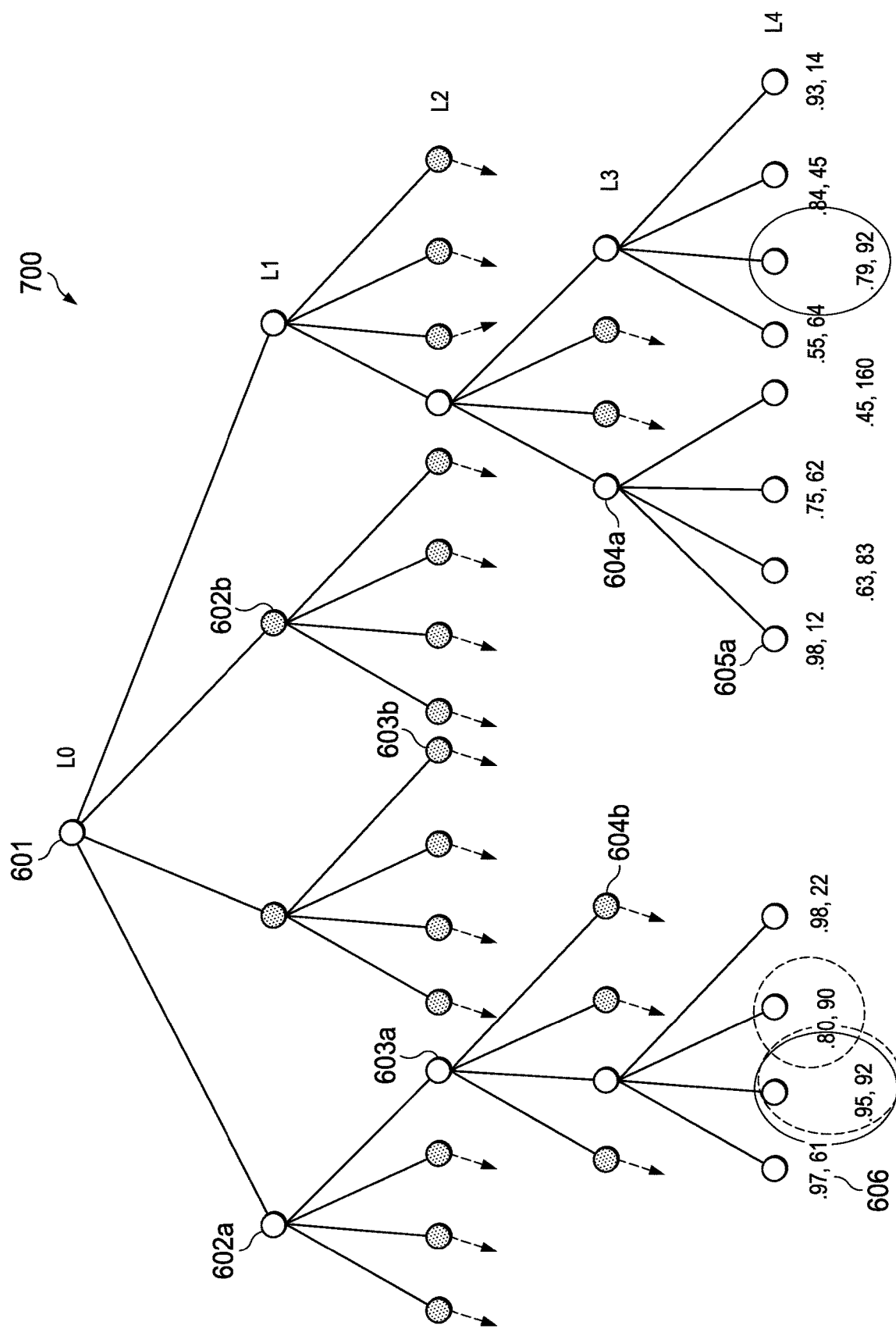
FIG. 7 illustrates an example decision tree for task scaling for maximizing worth of collection while meeting a minimum probability threshold using decentralized constellation management according to this disclosure.

FIG. 7 illustrates an example decision tree 700 for task scaling for maximizing worth of collection while meeting a minimum probability threshold using decentralized constellation management according to this disclosure. For ease of explanation, the decision tree 700 may be described as being used in the architecture 400 of FIG. 4 and the system 100 of FIG. 1. However, the decision tree 700 may involve the use of any other suitable architecture(s) or system(s).

As shown in FIG. 7, the decision tree 700 includes the same levels L0 through L4 and nodes 601, 602a-602b, 603a-603b, 604a-604b, 605a as the decision tree 600 of FIG. 6. The value sets 606 shown in FIG. 7 are also the same value sets as in the decision tree 600. The left value of each value set 606 represents the probability P(x), and the right value represents the worth W(x) for the corresponding satellite operation. The two satellite operations with the highest worth are indicated with solid circles. However, these selections do not meet the probability threshold set for the task. The two satellite operations that have the highest worth that meets the probability threshold are indicated with broken circles. That is, the value combinations [0.95, 92] and [0.80, 90] represent the best selection for both probability and worth. Thus, the satellite operations in the broken circles represent selections where probability and worth are optimized together. While there are satellite operations with higher probabilities (such as 0.98), those satellite operations are associated with low worth values (such as 22 or 12), so the overall combination of probability and worth is lower.

In general, both the constellation manager 220 and the schedulers 251-254 operate to balance maximizing P(x) and maximizing W(x) (and sometimes minimizing R(x)). In some embodiments, the constellation manager 220 provides a minimum P(x) to be achieved to the schedulers 251-254, and the schedulers 251-254 map tasks to maximize W(x) within the constraints of the minimum P(x). By comparing FIGS. 6 and 7, it is easy to understand how FIG. 7 may be extrapolated to also take into account R(x) such that tasking selections are made to optimize P(x), W(x), and R(x) in combination. Like P(x), R(x) could be handled by having threshold values that satellite operations need to stay within while maximizing overall worth.

Although FIG. 7 illustrates one example decision tree 700 for task scaling for maximizing worth of collection while meeting a minimum probability threshold using decentralized constellation management, various changes may be made to FIG. 7. For example, the decision tree 700 may include any number of constellation managers, schedulers, satellite assets, opportunities, and satellite operations. Also, components may be deleted or arranged in a different order, and additional components may be added according to particular needs.

Figure 8:
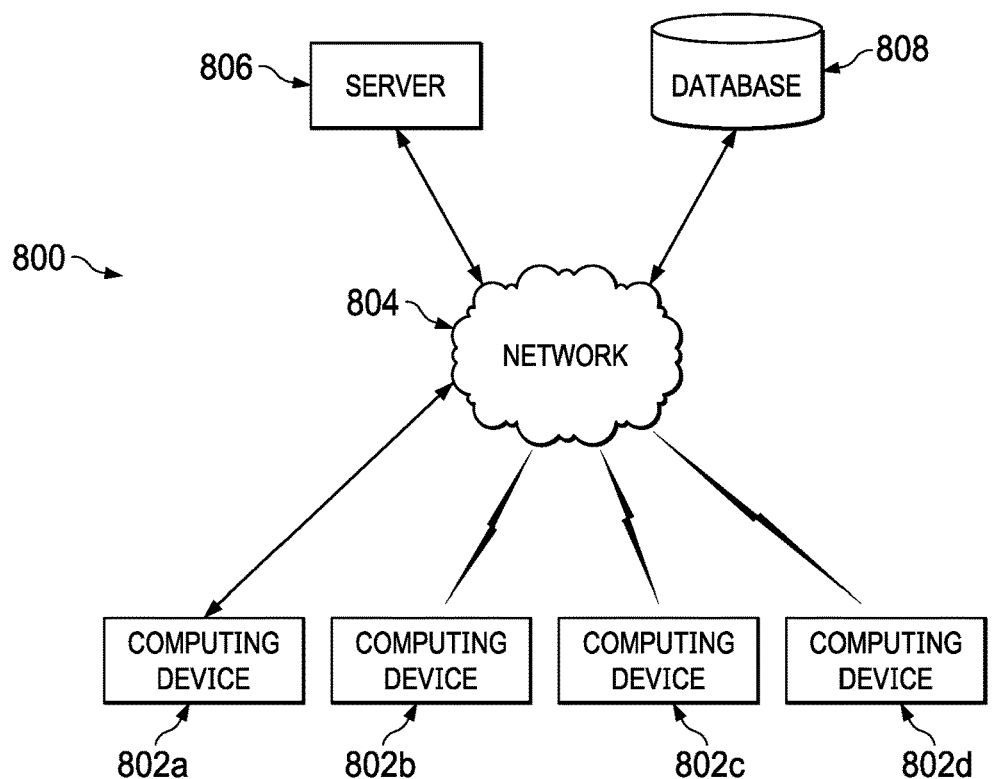
FIG. 8 illustrates an example system for use in constellation management and scheduling according to this disclosure.

FIG. 8 illustrates an example system 800 for use in constellation management and scheduling according to this disclosure. Some or all of the system 800 may, for example, be used to at least partially implement the functionality of the system 100 of FIG. 1, the architecture 200 of FIG. 2, or the architecture 400 of FIG. 4. As shown in FIG. 8, the system 800 includes multiple computing devices 802a-802d, at least one network 804, at least one server 806, and at least one database 808. Note, however, that other combinations and arrangements of components may also be used here.

In this example, each computing device 802a-802d is coupled to or communicates over the network 804. Communications between each computing device 802a-802d and a network 804 may occur in any suitable manner, such as via a wired or wireless connection. Each computing device 802a-802d represents any suitable device or system used to provide information to the server 806 or database 808 or to receive information from the server 806 or database 808. Any suitable number(s) and type(s) of computing devices 802a-802d may be used in the system 800. In some embodiments, the computing devices 802a-802d can represent the schedulers 111-113 or the satellite assets 121-125 of FIG. 1. Each computing device 802a-802d includes any suitable structure configured to transmit and/or receive information.

The network 804 facilitates communication between various components of the system 800. For example, the network 804 may communicate Internet Protocol (IP) packets, frame relay frames, Asynchronous Transfer Mode (ATM) cells, or other suitable information between network addresses. The network 804 may include one or more local area networks (LANs), metropolitan area networks (MANs), wide area networks (WANs), all or a portion of a global network such as the Internet, or any other communication system or systems at one or more locations. The network 804 may also operate according to any appropriate communication protocol or protocols.

The server 806 is coupled to the network 804 and is coupled to or otherwise communicates with the database 808. The server 806 supports the retrieval of information from the database 808 and the processing of that information. Of course, the database 808 may also be used within the server 806 to store information, in which case the server 806 may store the information itself. Among other things, the server 806 processes information for use in constellation management and scheduling. In some embodiments, the server 806 represents the constellation manager 105 of FIG. 1.

The server 806 includes any suitable structure configured for use in constellation management and scheduling. In some embodiments, the server 806 includes one or more processors, one or more memories, and one or more communication interfaces. Note, however, that the server 806 may be implemented in any suitable manner to perform the described functions. Also note that while described as a server here, the device(s) actually implementing the server 806 may represent one or more desktop computers, laptop computers, server computers, or other computing or data processing devices or systems.

The database 808 stores various information used, generated, or collected by the server 806 and the computing devices 802a-802d. For example, the database 808 may store information including the data pool 109 of FIG. 1. The database 808 includes any suitable structure configured to store and facilitate retrieval of information.

There are a number of possible ways to implement the system 800 in order to provide the described functionality of constellation management and scheduling. For example, in some embodiments, the server 806 and database 808 are owned, operated, or managed by a common entity. In other embodiments, the server 806 and database 808 are owned, operated, or managed by different entities. Note, however, that this disclosure is not limited to any particular organizational implementation.

Although FIG. 8 illustrates one example of a system 800 for use in constellation management and scheduling, various changes may be made to FIG. 8. For example, the system 800 may include any number of computing devices 802a-802d, networks 804, servers 806, and databases 808. Also, while FIG. 8 illustrates that one database 808 is coupled to the network 804, any number of databases 808 may reside at any location or locations accessible by the server 806, and each database 808 may be coupled directly or indirectly to the server 806. In addition, while FIG. 8 illustrates one example operational environment in which constellation management and scheduling is performed, this functionality may be used in any other suitable system.

Figure 9:
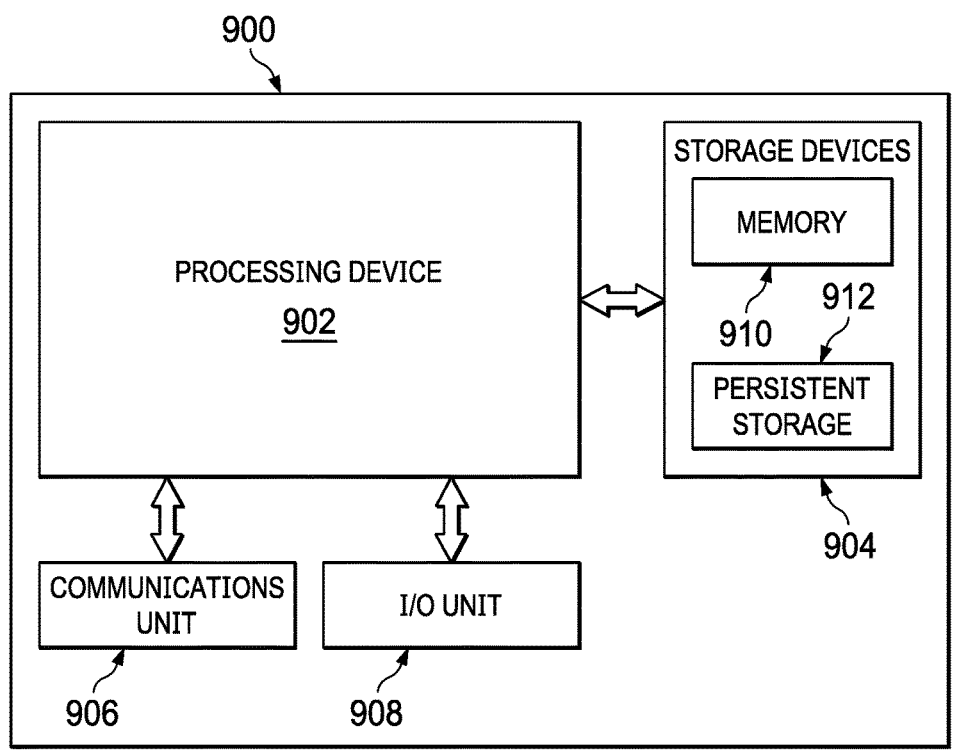
FIG. 9 illustrates an example device for use in constellation management and scheduling according to this disclosure.

FIG. 9 illustrates an example device 900 for use in constellation management and scheduling according to this disclosure. One or more instances of the device 900 may, for example, be used to at least partially implement the functionality of the constellation manager 105, the schedulers 111-113, or the satellite assets 121-125 of FIG. 1. However, the functionality of these components may be implemented in any other suitable manner.

As shown in FIG. 9, the device 900 denotes a computing device or system that includes at least one processing device 902, at least one storage device 904, at least one communications unit 906, and at least one input/output (I/O) unit 908. The processing device 902 may execute instructions that can be loaded into a memory 910. The processing device 902 includes any suitable number(s) and type(s) of processors or other devices in any suitable arrangement. Example types of processing devices 902 include one or more microprocessors, microcontrollers, digital signal processors (DSPs), application specific integrated circuits (ASICs), field programmable gate arrays (FPGAs), or discrete circuitry.

The memory 910 and a persistent storage 912 are examples of storage devices 904, which represent any structure(s) capable of storing and facilitating retrieval of information (such as data, program code, and/or other suitable information on a temporary or permanent basis). The memory 910 may represent a random access memory or any other suitable volatile or non-volatile storage device(s). The persistent storage 912 may contain one or more components or devices supporting longer-term storage of data, such as a read only memory, hard drive, Flash memory, or optical disc.

The communications unit 906 supports communications with other systems or devices. For example, the communications unit 906 can include a network interface card or a wireless transceiver facilitating communications over a wired or wireless network, such as the network 904. The communications unit 906 may support communications through any suitable physical or wireless communication link(s).

The I/O unit 908 allows for input and output of data. For example, the I/O unit 908 may provide a connection for user input through a keyboard, mouse, keypad, touchscreen, or other suitable input device. The I/O unit 908 may also send output to a display, printer, or other suitable output device. Note, however, that the I/O unit 908 may be omitted if the device 900 does not require local I/O, such as when the device 900 can be accessed remotely.

Although FIG. 9 illustrates one example of a device 900 for use in constellation management and scheduling, various changes may be made to FIG. 9. For example, computing devices and systems come in a wide variety of configurations, and FIG. 9 does not limit this disclosure to any particular computing device or system.

Figure 10:
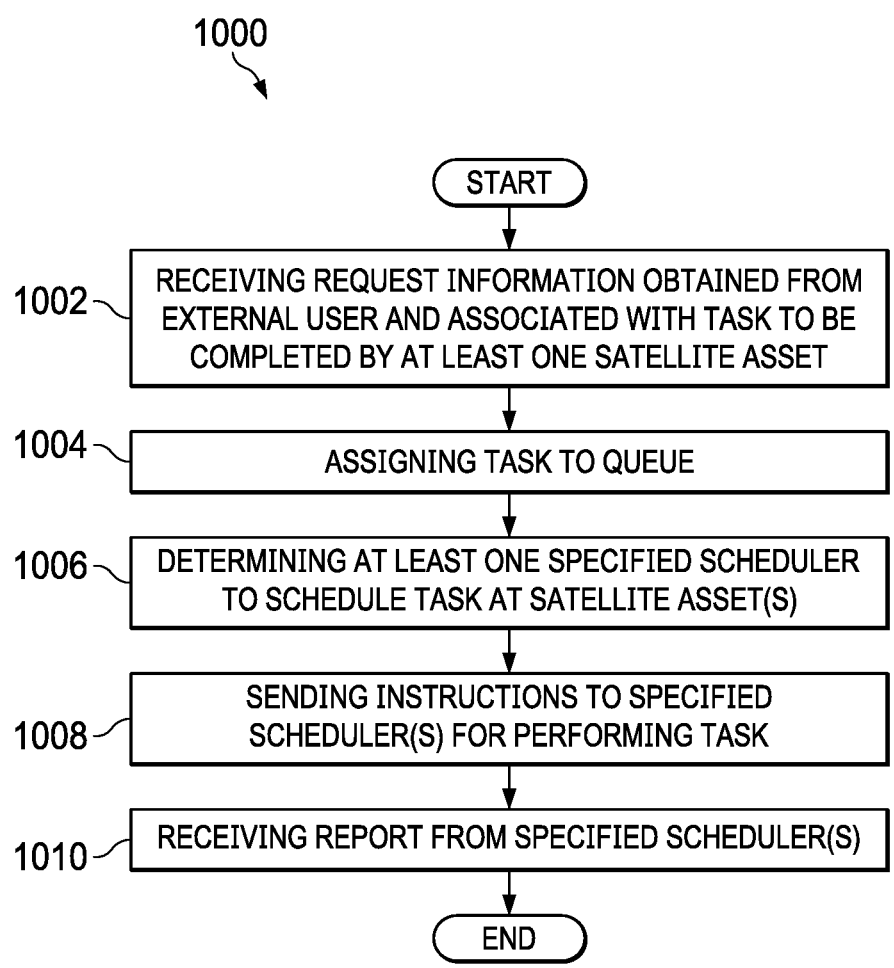
FIG. 10 illustrates an example method for constellation management and scheduling according to this disclosure according to this disclosure.

FIG. 10 illustrates an example method 1000 for constellation management and scheduling according to this disclosure according to this disclosure. For ease of explanation, the method 1000 of FIG. 10 may be described as being performed using the architecture 200 in FIG. 2 or the architecture 400 in FIG. 4, which may be implemented using one or more components of the system 100 of FIG. 1. However, the method 1000 may involve the use of any other suitable architecture(s) in any suitable system(s).

As shown in FIG. 10, request information obtained from an external user is received at step 1002. The request information is associated with a task to be completed by at least one satellite asset among a plurality of satellite assets. The satellite assets are grouped into a plurality of constellations, and each of the constellations is associated with a corresponding scheduler among a plurality of schedulers. This may include, for example, the constellation manager 220 receiving information from the external I/O block 210 that is associated with a task to be completed by at least one of the satellite assets 121-125. The task is assigned to a queue at step 1004. This may include, for example, the constellation manager 220 assigning the task to one of the queues 231. In some embodiments, the task includes a collection of data by the at least one satellite asset.

At least one specified scheduler is determined to schedule the task at the at least one satellite asset at step 1006. This may include, for example, the constellation manager 220 determining at least one of the schedulers 251-254 to schedule the task. In some embodiments, the at least one specified scheduler is determined by optimizing a probability of the collection by the at least one satellite asset. Also, in some embodiments, the at least one specified scheduler is further determined by optimizing a worth of the collection by the at least one satellite asset. This may include, for example, the constellation manager 220 optimizing P(x) and W(x) values for the collection. In some embodiments, the probability of the collection, the worth of the collection, and a risk of the collection are determined based on an uplink resource, a downlink resource, and the at least one satellite asset, such as shown in FIG. 5.

Instructions are sent to the at least one specified scheduler for performing the task by the at least one satellite asset at step 1008. This may include, for example, the attempter 242 or the suggester 402 sending instructions to at least one of the schedulers 251-254. Depending on whether the constellation management is centralized or decentralized, the instructions may include commands or suggestions for the schedulers 251-254. A report is received from the at least one specified scheduler after the at least one specified scheduler schedules the task at the at least one satellite asset at step 1010. This may include, for example, the scheduler 251-254 reporting information about the scheduling back to the attempter 242 or the suggester 402 at the constellation manager 220.

Although FIG. 10 illustrates one example of a method 1000 for constellation management and scheduling according to this disclosure, various changes may be made to FIG. 10. For example, while shown as a series of steps, various steps in FIG. 10 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed.

For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving request information obtained from an external user, the request information associated with a task to be completed by at least one satellite asset among a plurality of satellite assets, the satellite assets grouped into a plurality of constellations, each of the constellations associated with a corresponding scheduler among a plurality of schedulers, the task comprising a collection of data by the at least one satellite asset;
   assigning the task to a queue;
   determining at least one specified scheduler to schedule the task at the at least one satellite asset, wherein determining the at least one specified scheduler comprises (i) calculating a plurality of probability values each representing a probability of the collection by one of the plurality of satellite assets and (ii) selecting the at least one satellite asset based on the at least one satellite asset having at least one best probability value among the calculated probability values; and
   sending instructions to the at least one specified scheduler for performing the task by the at least one satellite asset.

2. The method of claim 1, wherein determining the at least one specified scheduler further comprises optimizing a risk of the collection by the at least one satellite asset.

3. The method of claim 2, wherein determining the at least one specified scheduler further comprises optimizing a worth of the collection by the at least one satellite asset.

4. The method of claim 3, wherein the probability of the collection, the worth of the collection, and the risk of the collection are determined based on an uplink resource, a downlink resource, and the at least one satellite asset.

5. The method of claim 1, wherein each scheduler is disposed close enough to its corresponding constellation that communication between the scheduler and its constellation is consistent and regular regardless of orbital position of the constellation or the scheduler.

6. The method of claim 1, further comprising:
   receiving a report from the at least one specified scheduler after the at least one specified scheduler schedules the task at the at least one satellite asset.

7. A system comprising:
   a plurality of schedulers configured to schedule a plurality of satellite assets, each scheduler associated with a corresponding constellation, each constellation comprising a group of the satellite assets; and
   a constellation manager configured to:
      receive request information obtained from an external user, the request information associated with a task to be completed by at least one satellite asset among the plurality of satellite assets, the task comprising a collection of data by the at least one satellite asset;
      assign the task to a queue;
      determine at least one specified scheduler to schedule the task at the at least one satellite asset, wherein, to determine the at least one specified scheduler, the constellation manager is configured to (i) calculate a plurality of probability values each representing a probability of the collection by one of the plurality of satellite assets and (ii) select at least one satellite asset based on the at least one satellite asset having at least one best probability value among the calculated probability values; and
      send instructions to the at least one specified scheduler for performing the task by the at least one satellite asset.

8. The system of claim 7, wherein, to determine the at least one specified scheduler, the constellation manager is configured to optimize a risk of the collection by the at least one satellite asset.

9. The system of claim 8, wherein, to determine the at least one specified scheduler, the constellation manager is configured to optimize a worth of the collection by the at least one satellite asset.

10. The system of claim 9, wherein the constellation manager is configured to determine the probability of the collection, the worth of the collection, and the risk of the collection based on an uplink resource, a downlink resource, and the at least one satellite asset.

11. The system of claim 7, wherein each scheduler is disposed close enough to its corresponding constellation that communication between the scheduler and its constellation is consistent and regular regardless of orbital position of the constellation or the scheduler.

12. The system of claim 7, wherein the constellation manager is further configured to receive a report from the at least one specified scheduler after the at least one specified scheduler schedules the task at the at least one satellite asset.

13. A non-transitory computer readable medium containing instructions that when executed cause at least one processor to:
   receive request information obtained from an external user, the request information associated with a task to be completed by at least one satellite asset among a plurality of satellite assets, the satellite assets grouped into a plurality of constellations, each of the constellations associated with a corresponding scheduler among a plurality of schedulers, the task comprising a collection of data by the at least one satellite asset;
   assign the task to a queue;
   determine at least one specified scheduler to schedule the task at the at least one satellite asset, wherein the instructions that when executed cause the at least one processor to determine the at least one specified scheduler comprise instructions that when executed cause the at least one processor to (i) calculate a plurality of probability values each representing a probability of the collection by one of the plurality of satellite assets and (ii) select at least one satellite asset based on the at least one satellite asset having at least one best probability value among the calculated probability values; and send instructions to the at least one specified scheduler for performing the task by the at least one satellite asset.

14. The non-transitory computer readable medium of claim 13, wherein the instructions that when executed cause the at least one processor to determine the at least one specified scheduler further comprise:

instructions that when executed cause the at least one processor to optimize a risk of the collection by the at least one satellite asset.

15. The non-transitory computer readable medium of claim 14, wherein the instructions that when executed cause the at least one processor to determine the at least one specified scheduler further comprise:

instructions that when executed cause the at least one processor to optimize a worth of the collection by the at least one satellite asset.

16. The non-transitory computer readable medium of claim 15, wherein the probability of the collection, the worth of the collection, and the risk of the collection are determined based on an uplink resource, a downlink resource, and the at least one satellite asset.

17. The non-transitory computer readable medium of claim 13, wherein the instructions when executed further cause the at least one processor to:

receive a report from the at least one specified scheduler after the at least one specified scheduler schedules the task at the at least one satellite asset.

18. The method of claim 1, wherein at least one of the schedulers is disposed at one of the satellite assets forming the constellation associated with the corresponding at least one scheduler.

19. The system of claim 7, wherein at least one of the schedulers is disposed at one of the satellite assets forming the constellation associated with the corresponding at least one scheduler.

20. The method of claim 1, wherein the plurality of probability values are calculated based on at least one of a task priority and a task timeframe.

* * * * *